US006978979B2

(12) United States Patent
Biester

(10) Patent No.: US 6,978,979 B2
(45) Date of Patent: Dec. 27, 2005

(54) ISOLATING DEVICE

(75) Inventor: Klaus Biester, Wienhausen (DE)

(73) Assignee: Cooper Cameron Corporation, Houston, TX (US)

( * ) Notice: Subject to any disclaimer, the term of this patent is extended or adjusted under 35 U.S.C. 154(b) by 38 days.

(21) Appl. No.: 10/415,696

(22) PCT Filed: Oct. 30, 2001

(86) PCT No.: PCT/EP01/12548

§ 371 (c)(1),
(2), (4) Date: Sep. 2, 2003

(87) PCT Pub. No.: WO02/37004

PCT Pub. Date: May 10, 2002

(65) Prior Publication Data

US 2004/0041113 A1    Mar. 4, 2004

(30) Foreign Application Priority Data

Oct. 30, 2000  (DE) ........................... 200 18 562 U

(51) Int. Cl.$^7$ ............................................. F16K 31/04

(52) U.S. Cl. .............. 251/129.11; 251/227; 251/249.5; 251/268

(58) Field of Search ...................... 251/129.11, 129.12, 251/129.13, 215, 226, 248, 249.5, 250.5, 251/267, 268, 272, 227

(56) References Cited

U.S. PATENT DOCUMENTS

| 3,324,741 A | | 6/1967 | ANderson .................... 74/625 |
| 4,346,728 A | * | 8/1982 | Sulzer ...................... 137/243.6 |
| 6,032,924 A | * | 3/2000 | Castle .................... 251/129.12 |
| 6,446,660 B1 | * | 9/2002 | Goni Usabiaga ........ 137/243.6 |

FOREIGN PATENT DOCUMENTS

| DE | 1 199 088 | 8/1965 | |
| DE | 3832304 | 3/1990 | ............ H02K 7/10 |
| DE | 199 09 712 | 9/2000 | ............ F15B 13/02 |
| FR | 1 390 757 | 2/1965 | |

* cited by examiner

Primary Examiner—David J. Walczak
Assistant Examiner—Peter deVore
(74) Attorney, Agent, or Firm—Conley Rose, P.C.

(57) ABSTRACT

Isolating device, in particular for an injection valve with a turning spindle, rotatably mounted in a device housing, actively connected to a drive device, for the variable displacement of an operating element for an isolation stop valve, connected to the turning spindle, by means of a gearbox unit. The aim of the invention is to improve said isolating device such that the above may be operated in a simple and controllable manner, whereby the control of the isolating device may be carried out from a remote position and in a secure manner. Said aim is achieved, whereby the drive device comprises at least two individually or synchronously operable electric motors and the gearbox unit comprises at least one in particular self-locking drive unit, said drive unit being connected to both electric motors for turning the turning spindle.

57 Claims, 6 Drawing Sheets

ISOLATING DEVICE

BACKGROUND OF THE INVENTION

The invention relates to an isolating device, in particular for an injection valve, with a turning spindle rotatably mounted in a device housing, actively connected to a drive device for the variable displacement of an operating element with an isolation stop valve connected to the turning spindle by means of a gearbox unit.

Such an isolating device is known from practice, and is, for example, operated via a handwheel or the like. By turning the handwheel the turning spindle is set rotating via a gearbox unit arranged between the handwheel and a turning spindle, and the operating element with the isolation stop valve is moved towards the injection valve or away from it together with the turning spindle. By the isolation stop valve, the injection valve can be closed or the passage thereof can be varied.

Corresponding isolating devices with hydraulic drive device are also known from practice. With these, corresponding feed or outlet lines for the hydraulic fluid to the isolating device, which are fixed to the device housing by means of corresponding connections, are necessary.

In particular in oil mining, the injection valve serves for injecting chemical substances which prevent that, for example, when the crude oil cools down when it is exiting the oil well, constituents of the crude oil solidify and possibly deposit in the conveying device. In an extreme case, the deposition of these solidifying substances can result in a seal of the conveying device. As oil is also extracted at places difficult to access, such as below sea level, the operation of isolating devices known from practice is difficult. For example, the manually operated isolating device has to be operated near the ocean floor by a diver or a corresponding submersible vessel. With such a manual operation, moreover a check of the setting of the isolating device and thus the closing of the injection valve is not sufficiently possible.

With the hydraulically operated isolating devices, it has to be noted that it is relatively complicated to supply them with hydraulic fluid and that corresponding connection lines have to be placed and connected to associated hydraulic fluid sources. If there is a leak at the corresponding hydraulic lines, the isolating device can no longer be correctly operated, and finding and repairing the leak is time-consuming and costly.

BRIEF SUMMARY OF THE PREFERRED EMBODIMENTS

The object underlying the subject matter of the application is therefore to improve an isolating device of the above mentioned type, such that it may be operated in a simple and controllable manner, whereby the isolating device may be controlled from a remote position and in a secure manner.

According to the invention, this object is achieved in connection with the features of the preamble of claim 1 in that the drive device comprises at least two individually or synchronously operable electric motors and the gearbox unit comprises at least one in particular self-locking drive unit, said drive unit being actively connected to both electric motors for turning the turning spindle.

By the use of electric motors, the operation of the isolating device is considerably facilitated. A manual operation is no longer necessary. Similarly, hydraulic lines, a hydraulic fluid source and the further devices necessary for a hydraulic operation of such an isolating device can be dispensed with. With an electrically operated isolating device, no leak can occur in corresponding hydraulic lines, such that a maintenance and repair of such an isolating device according to the invention are considerably facilitated.

The electric motors can be operated and controlled from a remote position. It is not necessary to arrange corresponding control devices, a hydraulic supply and the like, for example near the drilling hole, such as on a platform above sea level. The control can also be done from the land. This is analogously true for places difficult to access where drillings are performed.

By using the self-locking drive unit and the driving connection thereof with the electric motors, it is achieved according to the invention that an automatic adjustment of the isolation stop valve of the isolating device is not possible, but that it is only possible after a corresponding release moment has been applied by one or both electric motors.

According to the invention, it is possible to use the two motors redundantly, such that only one electric motor at a time operates the isolating device. It is also possible to operate both electric motors, in particular for applying a higher torque, synchronously and to employ them simultaneously for turning the turning spindle and thus for adjusting the isolation stop valve.

The self-locking drive unit can be self-locking in both moving senses of the turning spindle. It is also possible for it to be, for example, only self-locking in the restoring direction of the turning spindle, thus preventing an automatic restoration c)f the isolation stop valve from its isolating position in the injection valve.

A reliable and easily controllable motor is obtained if the electric motor is a servomotor, in particular a direct-current servomotor.

For redundance reasons, it can be furthermore considered to be advantageous if each electric motor is electrically connected to a separate control device. The corresponding control devices are arranged remote from the isolating device, such that the electric motors and thus the isolating device can be operated in remote control.

In order to be able to connect the electric motors to their control devices also separately from the outside, for each electric motor one electrical connection device may be formed at the device housing.

The self-locking drive unit can have various designs. One example for such a drive unit is a ratchet or planet wheel gear as well as a volute spring. A self-locking drive unit easy to be manufactured and operated can be a worm gear pair consisting at least of worm and worm wheel, the worm wheel being associated to the turning spindle and the worm to the electric motors. Such a worm gear pair can be self-locking in both moving senses or only in one moving sense.

In order to easily connect the worm gear pair to the electric motors, the worm can be arranged on a worm shaft actively connected to both electric motors.

It is possible to associate both electric motors to one shaft end of the worm shaft and provide them essentially directly one behind the other on this worm shaft. In another possibility of arranging the electric motors, the same can be each actively connected to opposite shaft ends of the worm shaft.

One example of such a driving connection may be that each electric motor is stationarily connected with its motor shaft to the respective shaft end. It is also possible for each shaft end in the electric motor to be stationarily arranged essentially as the motor shaft thereof.

In order to fix the electric motors in the device housing in a simple manner, the electric motor can be stationarily held in the device housing by means of a ring nut.

As a further safety measure for the operation of the isolating device and thus the injection valve, the motor shaft of at least one electric motor can be elongated at its end facing away from the worm shaft and movably connected at this end to an emergency release device. If both electric motors fail, the isolation stop valve can still be adjusted by means of the emergency release device.

The emergency release device can be manually operated.

A simple embodiment of an emergency release device may be that the same comprises at least one supporting sleeve stationarily held in the device housing and a spacing sleeve mounted to rotate relatively to said supporting sleeve, a releasable volute spring being wound on the outside as part of the self-locking drive unit. The volute spring stationarily connects the supporting sleeve and the spacing sleeve, and only after their release, the spacing sleeve can be rotated relatively to the supporting sleeve and thus the turning spindle can be rotated and the isolation stop valve adjusted by means of the movable connection between the spacing sleeve and the worm shaft.

In order to be able to control the emergency release device even from a remote position, the volute spring can engage with one of its ends a release sleeve which is connected to an electric motor, in particular a stepper motor. By a remote-controlled operation of the stepper motor, the release sleeve can be rotated, the volute spring released via one of its ends and subsequently, the spacing sleeve can rotate relatively to the supporting sleeve. The volute spring can be wound up by the stepper motor.

In order to securely mount the worm shaft and/or the motor shaft in the device housing even for high stresses, at least each shaft end can be rotatably held in the device housing by ball bearings and/or roller bearings.

The worm wheel can be actively connected directly to the turning spindle. One example of such a driving connection is, for example, that the worm wheel is directly arranged on the turning spindle or as a part thereof. Another possibility for the driving connection between the worm wheel or worm, respectively, and the turning spindle can be that the worm wheel is arranged on a bearing shaft in moving connection with the turning spindle. In this manner, the bearing shaft is rotated by the engagement between the worm and worm wheel and this rotation is transmitted to the turning spindle via the driving connection with the turning spindle. Via the turning spindle, the operating element with the isolation stop valve can then be correspondingly adjusted.

In order to be able to use a worm wheel having a relatively large diameter even with a low-diameter bearing shaft, a bearing sleeve can be arranged between worm wheel and bearing shaft. The same is stationarily connected to the worm wheel as well as to the bearing shaft.

A simple possibility of a stationary connection between, for example, the worm wheel and bearing sleeve can be that the bearing sleeve and worm wheel are detachably connected by a spline connection and/or studs. The spline connection can be formed by a ratchet or the like. By the use of the worm gear pair, a corresponding multiplication between the rotation of the electric motors and the rotation of the turning spindle is already achieved. In order to even increase the multiplication, the gearbox unit can comprise a ball screw of at least one ball nut and the turning spindle as recirculating ball screw.

In another embodiment, instead of a ball screw, a roller screw of at least one roller nut and the turning spindle is used as recirculating roller screw.

In order to obtain a roller screw having a long service life, a high bearing strength and further advantages, such as a high reliability, a smooth run etc., the roller screw can be a planetary roller screw.

For a simple bearing of the screw nut (roller nut, ball nut) in the device housing, the screw nut can be arranged in a bearing sleeve which is mounted to rotate in the device housing but cannot be axially displaced.

If the turning spindle and the bearing shaft are arranged in series, a simple connection between them can be made in that the bearing shaft engages the end of the turning spindle facing it and is stationarily held therein. In order to be able to mount the bearing shaft or the bearing sleeve, respectively, in this connection in the device housing in a simple manner, at least one needle bearing can be arranged between the bearing sleeve and the device housing.

Instead of a series arrangement of the worm gear pair and the ball screw and the additional use of a bearing shaft and bearing sleeve, in a further embodiment of the invention, there also is the possibility that at least at one end of the screw nut, an end gearing is arranged which is engaged with a gearing of the worm wheel. In this manner, a direct driving connection between the worm wheel and the screw nut is constituted.

The assembly can be still facilitated by forming the end gearing by the worm wheel, such that the worm wheel is arranged essentially coaxially to the screw nut.

In this connection, it can be considered to be favourable favorable for the worm wheel to be detachably fixed in particular to the screw nut. Thus, the worm wheel and the screw nut are two separate parts which, however, can be stationarily interconnected in a simple manner.

The worm wheel and worm can have various designs. For example, the worm wheel can be a globoid worm wheel or a spur gear. The worm can also be an enveloping worm or a cylinder worm.

In order to securely accommodate the bearing sleeve with the screw nut in the housing, the bearing sleeve can be rotatably mounted in the device housing by means of at least one thrust bearing.

In order to be able to separately exchange or even manufacture and optionally maintain parts of the isolating device, the device housing can be modularly assembled from sub-housings, which are interconnected by means of studs, threaded rings or the like. Each sub-housing can be handled separately and can be assembled with the other sub-housings on the spot to form the isolating device. For example, one sub-housing can be provided for accommodating the drive device and worm gear pair, one sub-housing for arranging the ball screw, one sub-housing for accommodating the operating element etc.

In particular if the isolating device is employed below sea level, it is advantageous for the sub-housing to be tightly interconnected.

For the particular arrangement of a roller screw and a worm gear pair in an adequately compression-proof housing, the device housing can comprise a central body of metal, in particular aluminum or an aluminium aluminum alloy, in the central bore of which the screw nut is mounted and along which the turning spindle extends.

The electric motors can also be accommodated in this central body, and it can be considered to be advantageous for the central body to comprise two motor openings radially opened to the outside, in each of which one electric motor is detachably fixed, wherein between the motor openings and essentially tangentially to the central bore, a connection opening for arranging the worm shaft and the worm extends. The connection opening can also be formed as radial extension of the central bore.

In order to facilitate the access to the isolating device and in particular to the roller screw and worm gear pair, the central body can be detachably sealed by an end plate at one of its ends.

In order to be able to exactly determine the position of the turning spindle and thus of the operating element or the isolation stop valve, respectively, within the isolating device from a position remote from the isolating device, a positioning sensor can be arranged in the end plate and associated to one end of the turning spindle. By means of the positioning sensor, one can determine to what extent the turning spindle moves away from or towards the sensor. Correspondingly, one can determine where the isolation stop valve is located relative to the injection valve.

A simple possibility of mounting the isolating device at the injection valve can be that the device housing or a sub-housing, respectively, can be detachably mounted at an injection valve housing and that the isolation stop valve can be displaced transversely to a connection line within the injection valve housing between a fluid pump and a valve arrangement of the injection valve to the variable isolation of the connection line.

In order to assist the restoration of the operating element and the isolation stop valve, within at least one sub-housing, a spring arrangement for applying force to the operating element or the turning spindle, respectively, in the starting position can be arranged.

This spring arrangement can, for example, be formed by a Belville spring.

If both electric motors are operated simultaneously, they have to be synchronized in their movement and in particular in their drive of the worm shaft. This car preferably be achieved by a software synchronization.

The synchronization is facilitated and easier to control by switching one electric motor as master and the other electric motor as slave, or by switching both motors as master. In a case of emergency, the adjustment can also be effected by only one motor.

In order to correspondingly supply the electric motors and further electric apparatuses of the isolating device from outside the device housing, an electrical passage for the electrical connection of the motors with their control devices can be arranged in the housings.

If the isolating device is employed below sea level, the device housing can be filled with oil and compensated for a pressure compensation. In this connection, the compensation relates to a corresponding additional oil supply or oil withdrawal to the or from the device housing, for example in order to compensate changed temperature conditions.

In order to reinforce the operating element, for example, the same can comprise a piston housing connected to a shaft section connected to the turning spindle.

In order to determine in this connection the starting position of the operating element in a simple manner, the shaft section can be surrounded by an annular locknut which is screwed in the device housing for determining the starting position of the piston housing and thus of the operating element.

For the spring arrangement to be able to support at one of its ends at the operating element to apply a force thereto in the starting position, the piston housing can comprise at its end facing the locknut an end flange radially projecting to the outside to which one end of the spring arrangement is adjacent.

In order to seal the isolating device with respect to the injection valve when these are connected, the device housing can comprise sealing elements on its end face facing the injection valve for sealingly fixing it to the injection valve housing.

Corresponding to the arrangement of the sub-housings, the various shafts, spindles or operating elements in the device housing can be also correspondingly subdivided and detachably interconnectable. This is preferably done in that the bearing shaft, turning spindle and operating element are arranged essentially coaxially and are detachably interconnected at their facing ends.

In order to further increase the multiplication, a so-called harmonic drive can be arranged between the worm gear pair and the ball screw.

BRIEF DESCRIPTION OF THE DRAWINGS

Advantageous embodiments of the invention are illustrated with reference to the Figures enclosed in the drawing as follows.

In the drawings.

DETAILED DESCRIPTION OF THE PREFERRED EMBODIMENTS

Figure 1:
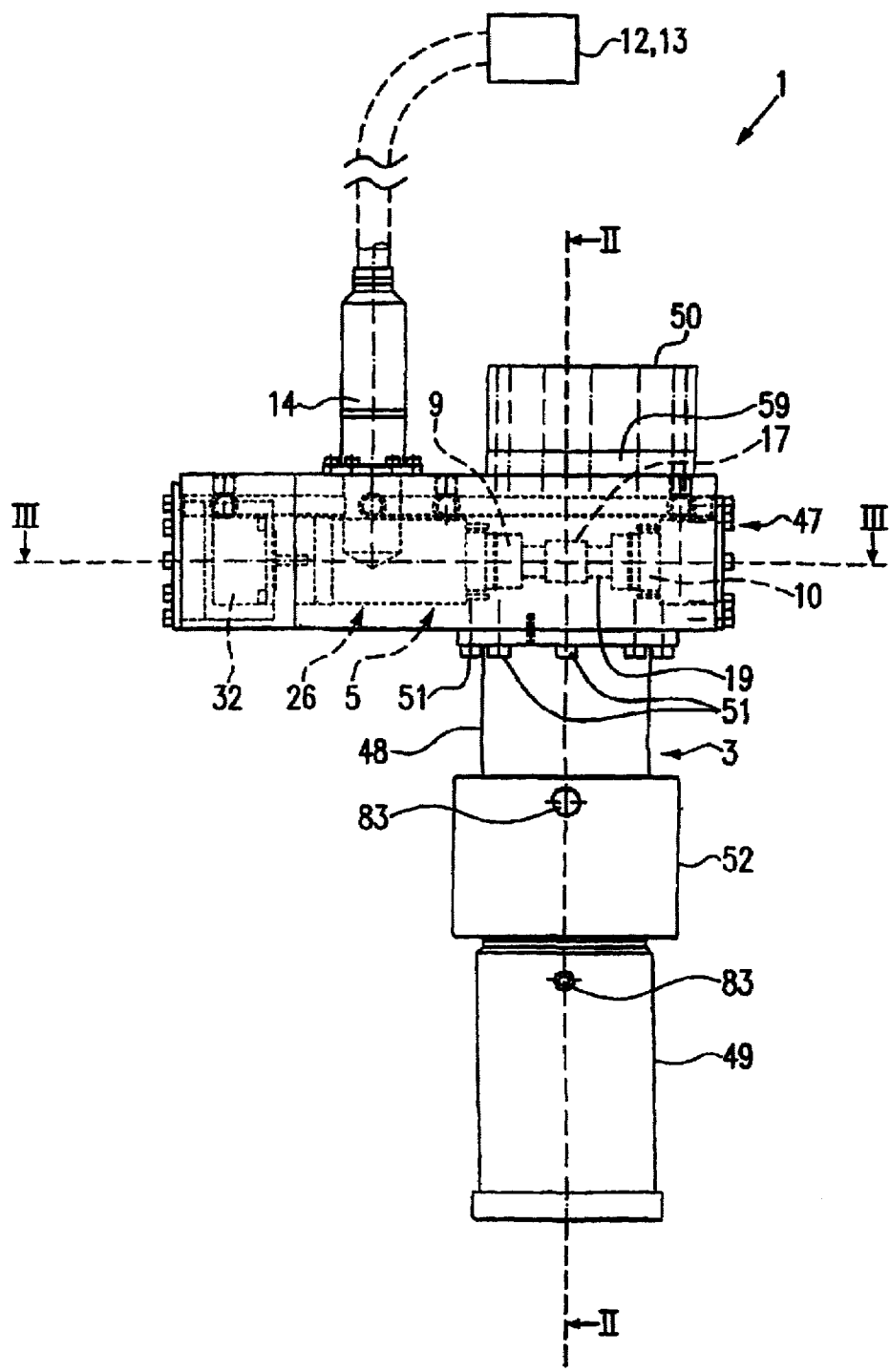
FIG. 1 shows a plan view onto a first embodiment of an isolating device.

In FIG. 1, a plan view onto a first embodiment of an isolating device 1 according to the invention is represented. It comprises a device housing 3 of various sub-housings 47, 48, 49 and 50. The sub-housings are detachably interconnected. Studs 51 or a threaded ring 52, respectively, serve for the detachable connection. In the sub-housing 47, in particular a drive device 5 with two electric motors 9 and 10 is arranged. These are arranged at both ends of a worm shaft 19 on which approximately centrically a worm 17 is provided.

An emergency release device 26 is associated to one electric motor 9, which device can be actuated by an electromotor 32.

On one upper side of the sub-housing 47, a connection device 14 is arranged via which the electric motors and the electromotor can be connected with remotely arranged control devices 12 and 13, respectively.

The sub-housing 47 is detachably sealed by an end plate 59 adjacent to the connection device 14. Another sub-housing 50 is placed thereupon and contains in particular a positioning sensor, see for example FIG. 2.

Figure 2:
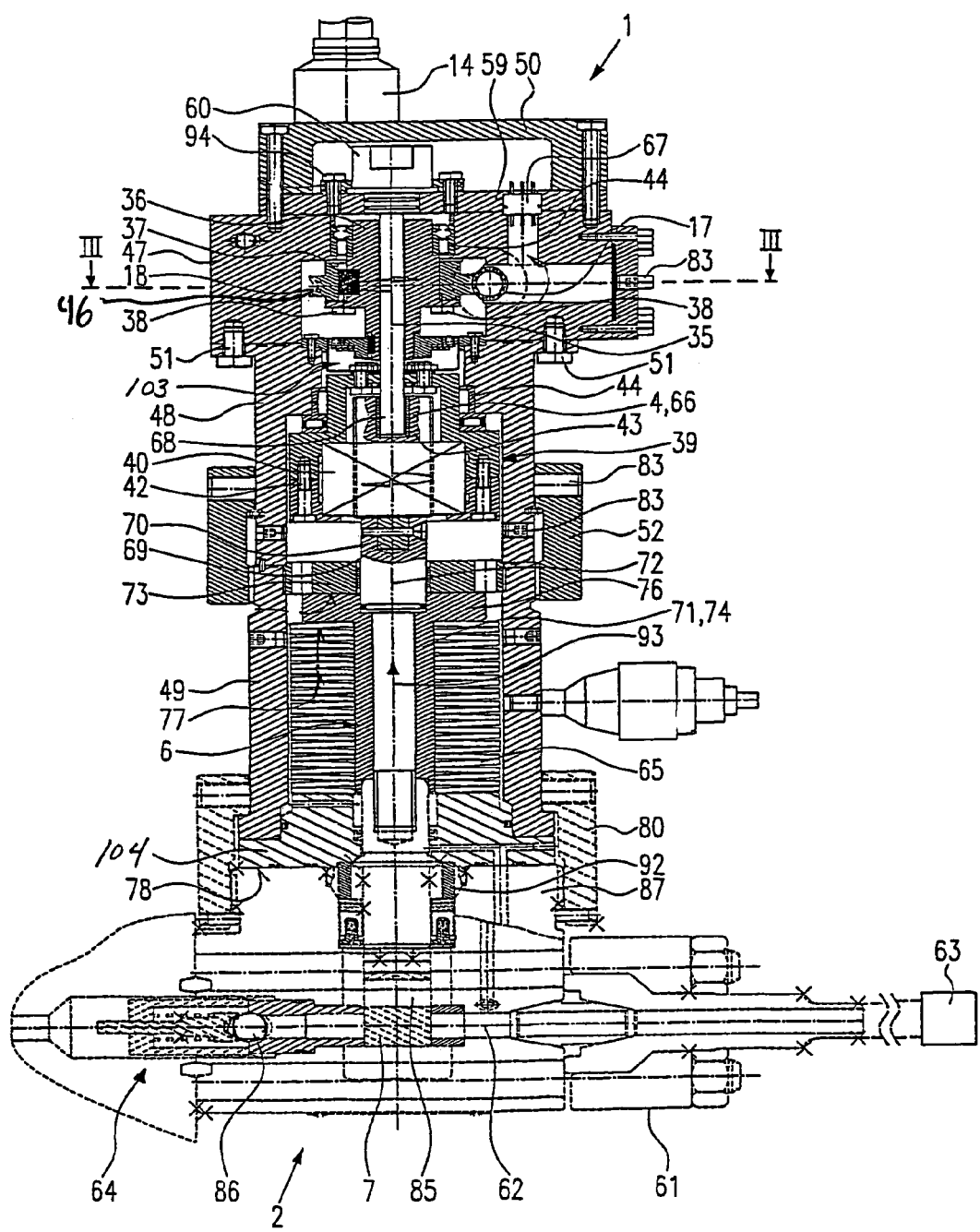
FIG. 2 shows a section along the line II—II of FIG. 1 with a partially represented injection valve.

In FIG. 2, a section along the line II—II of FIG. 1 is represented. In this Figure as in the other Figures, same parts are provided with the same reference numerals and are therefore only partly described.

In FIG. 2, in addition to the isolating device 1, an injection valve 2 with a corresponding injection valve housing 61 is represented. The same can be fixed at one end of the isolating device 1 by means of a threaded sleeve 80. In this case, the two housings are sealed relative to one another via sealing elements 79 which are arranged in an end face 78 of the device housing 3 of the isolating device 1.

The injection valve 2 essentially comprises a connection line 62, which is connected on the one hand with a fluid pump 63 and on the other hand with a ball valve 86 as a valve arrangement 64. An isolation stop valve engages the connection line 62, such that the connection between the pump 63 and the valve arrangement 64 is interrupted. By shifting the isolation stop valve 7 out of the isolating device 1, a slider opening 85 of the isolation stop valve 7 can be arranged in the connection line 62, which more or less constitutes a connection between the pump 63 and the valve arrangement 64 depending on the positioning of the slider opening 85.

The isolation stop valve 7 is arranged at the end of an operating element 6 extending through the device housing 3 of the isolating device 1 from the injection valve housing 61 towards a gearbox unit 8 consisting of screw 39 and worm gear pair 16.

The operating element 6 comprises, apart from the isolation stop valve 7, an end part 92 represented in FIG. 2 in broken lines, which part is engaged by a shaft 93. The same is arranged within a piston housing 71 and connected to a shaft section 72 at its end opposite the end part 92. The piston housing 71 is fixed thereto arid there comprises an end flange 76 radially extending to the outside. One end 77 of a spring arrangement 65 is supported on this end flange 76, the other end being supported on the sealing body 104 of the device housing 3. The threaded sleeve 80 is rotatably mounted around the sealing body 104 and can be screwed upon a side extension 87 of the injection valve housing 61.

In FIG. 2, the piston housing 71 is represented in a starting position 74, in which the end flange 76 is adjacent to a locknut 73 screwed into the sub-housing 49.

The threaded ring 52 serves for connecting the sub-housings 49 and 48 and is notatably mounted at the sub-housing 48 and screwed upon the sub-housing 49 from the outside.

In the sub-housing 48, a screw 39 is arranged as part of the gearbox unit 8.

The screw 39 is formed of a screw nut 40, in this case a revolving roller nut, and the turning spindle 4, forming together a planetary roller screw. At its end 69 facing the operating element 6, the turning spindle 4 is inserted into a hole at the end 70 of the operating element 6 or the shaft section 72, respectively, and held therein by means of a bolt 90 (see FIG. 5). The screw nut 40 is rotatably, but axially stationanily arranged in a bearing sleeve 42. The end 69 of the turning spindle 4 projects from the bearing sleeve 42 in the direction of the operating element 6.

Opposite to the end 69, the turning spindle 4 projects with its other end 43 from the screw nut 40 and is there also surrounded by a section of the lower-diameter bearing sleeve 42. At the outside of this section, the bearing sleeve 42 is rotatably mounted in the device housing 3 or in the sub-housing 48, respectively, by means of a needle bearing 44.

A bearing shaft 35 passes through the bearing sleeve 42, the end 68 thereof being inserted in the end 43 of the turning spindle 4 and being stationarily held therein.

In FIG. 2, the turning spindle 4 is represented in its starting position 66, i.e. as far as possible inserted through the screw nut 40 in the direction away from the injection valve 2 into the device housing 3.

In another embodiment according to FIG. 2, it is also possible for the screw nut 40 not to be arranged in the interior of the device housing only stationanily with respect to axial displacements but also to rotations via the bearing sleeve 42. In this case, the turning spindle 4 is rotated directly by the connection to the bearing shaft 35.

Figure 3:
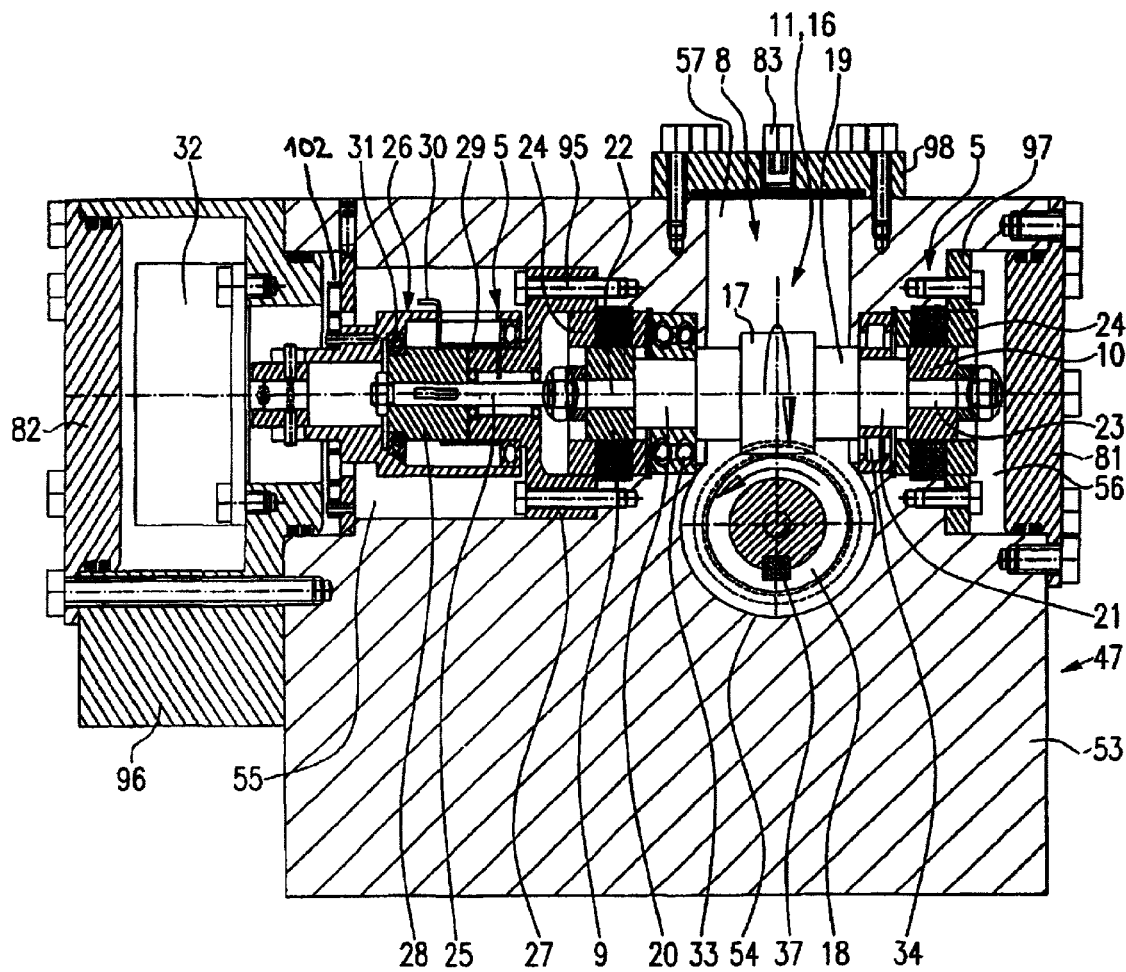
FIG. 3 shows a section along the line III—III of FIG. 1 or FIG. 2, respectively.

In the sub-housing 47, essentially the bearing shaft 35 and a drive device 5, also see FIG. 3, for the isolating device 1 are arranged. The bearing shaft 35 is arranged in a bearing sleeve 36, which is stationanily connected to a worm wheel 18 as part of the worm gear pair 16 via a spline connection. The worm wheel 18 is a globoid worm wheel and engaged with its gearing 46 with a worm 17.

The bearing sleeve 36 is rotatably mounted in the sub-housing 47 via needle bearings 44. The latter is detachably connected to the sub-housing 48 via studs 51. At the end of the sub-housing 47 opposite to the sub-housing 48, the same is detachably sealed by an end plate 59. A hood-like sub-housing 50 is placed onto the end plate 59 and detachably connected thereto. In the sub-housing 50, a positioning sensor 60 is arranged and fixed there by means of a supporting ring and corresponding screws 94.

Between the worm gear pair 16 and the screw 39, a so-called harmonic drive 102 is arranged as further part of the gearbox unit 8 for further increasing the multiplication.

In the end plate 59, electrical passages 67 are arranged via which the electrical connection of devices arranged within the sub-size 47 is effected, see FIG. 3.

In FIG. 3, a section along the line III—III of FIGS. 1 and 2, respectively, is represented. The sub-housing 47 is essentially formed of a massive central body 53 in which a central bore 54 is formed. In this bore, see FIG. 2, the bearing sleeve 36 is rotatably mounted.

The worm wheel 18 is stationarily connected to the bearing sleeve 36 via the splined shaft connection 37 in the form of a ratchet, or studs 38. The same is engaged with its external gearing in a corresponding external gearing of the worm 17. The worm 17 is arranged on a worm shaft 19 which extends approximately tangentially to the central bore 54.

Shaft ends 20, 21 of the worm shaft 19 are rotatably mounted by means of a ball bearing 33 or a roller bearing 34, respectively. An electric motor 9,10 of the drive device 5 is associated to each of the ends 20, 21 of the worm shaft 19. The electric motor 9 is directly actively connected with the shaft end 20 or a motor shaft 22, respectively, and is detachably mounted in a motor opening 55 in the central body 53. The mounting is effected in this connection via a ring nut 24 which is screwed in within a supporting sleeve 27. The supporting sleeve 27 is fixed in the motor opening 55 via screws 95.

One end 25 of the motor shaft 22 extends beyond the electric motor 9, which is designed as a servomotor and in particular as a direct-current servomotor as is the other electric motor 10, along a narrowed section of the supporting sleeve 27. The end 25 of the motor shaft 22 is rotatably mounted in this narrowed section of the supporting sleeve 27.

The motor shaft 22 extends beyond the supporting sleeve 27 into a spacing sleeve 28 and is fixed by a nut at its end. The spacing sleeve 28 is stationarily connected to the supporting sleeve 27 in one sense of rotation via a volute spring 29 wound up at its outer sides with the volute spring being tense. With one of its ends 30, the volute spring 29 engages a release sleeve 31, which is rotatably mounted with respect to the spacing sleeve 28 and the supporting sleeve 27.

The release sleeve 31 is actively connected to a drive shaft of an electromotor 32 via a pin connection. This electromotor is designed as a stepper motor. The electromotor is arranged in a side housing 96 in the extension of the motor opening 55. The side housing 96 is detachably sealed by a cover 82.

The other electric motor 5 is also detachably held in a motor opening 56 by means of a mounting 97 and a ring nut 24. The motor shaft 23 is connected to the end 21 of the worm shaft 19 or is formed as a part thereof and extends through the electric motor 5 beyond its end opposite of the worm shaft 19. There, the motor shaft is held by a spacing ring and a nut.

In a cover 98 of the connection opening 57 connecting the motor openings 55 and 56, a plug 83 is arranged, also see the other plugs, for example in FIG. 2.

Moreover, a spiral spring 102 is connected to the side housing 96 which is in particular detachably connected with an inner end to the side housing 96 and with an outer end to a ring flange surrounding the side housing while being spaced therefrom.

Figure 4:
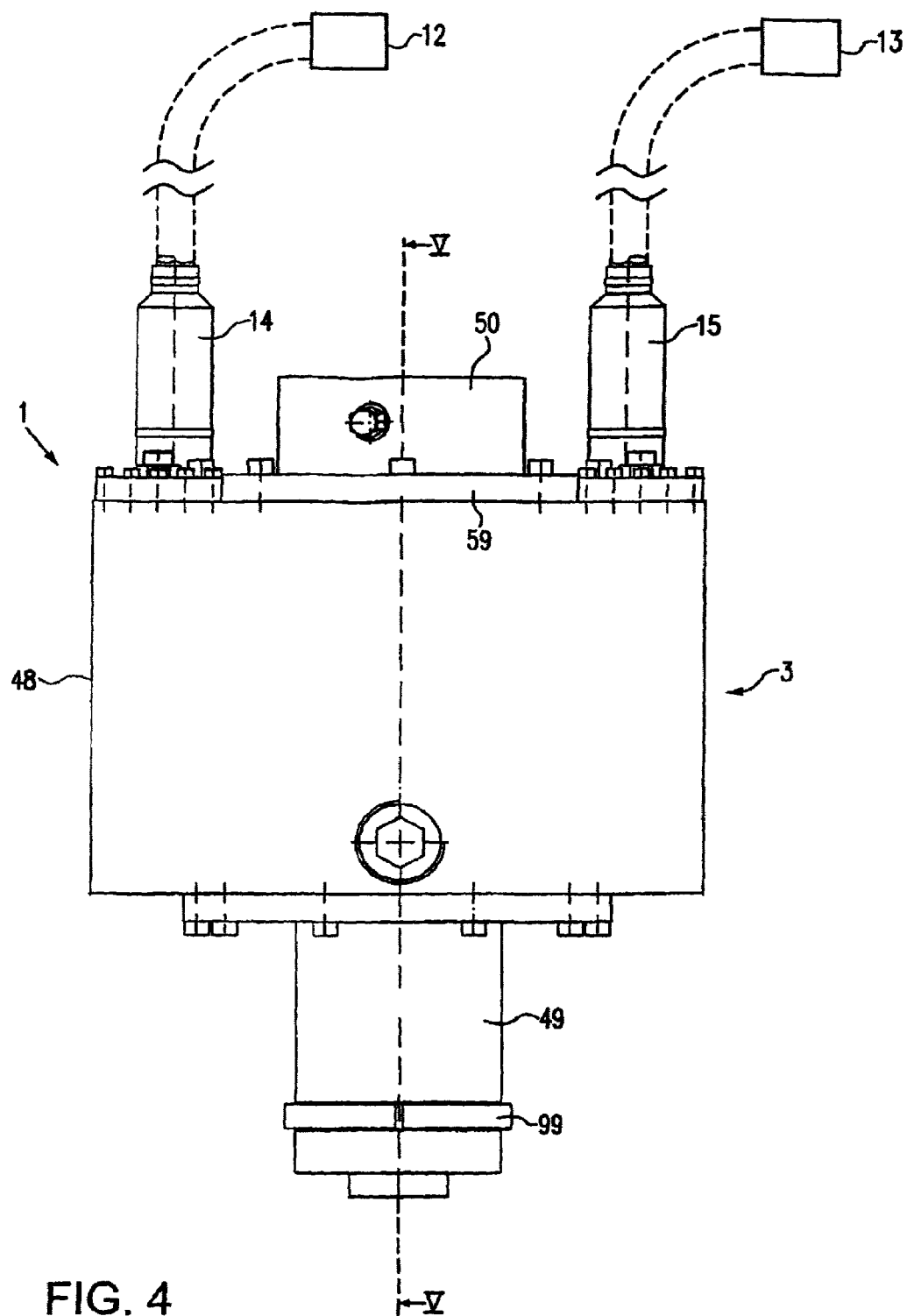
FIG. 4 shows a plan view onto a second embodiment of an isolating device according to the invention.

In FIG. 4, a plan view onto a second embodiment of an isolating device 1 according to the invention is represented. The same also comprises a device housing 3 consisting of sub-housings 48, 49, and 50. An end plate 59 onto which the sub-housing 50 is screwed is arranged between the sub-housings 48 and 50. The end plate 59 is also detachably mounted to the sub-housing 48 by screwing. In the area of the end plate 59, two connection devices 14,15 for electrical connection lines for the supply and for controlling the drive device are arranged, see FIGS. 5 and 6. Electrical connection lines extend from the connection devices up to the control device 12,13. These are arranged at a remote position and serve for the remote-controlled operation and control of the isolating device 1, also see FIG. 1.

Figure 5:
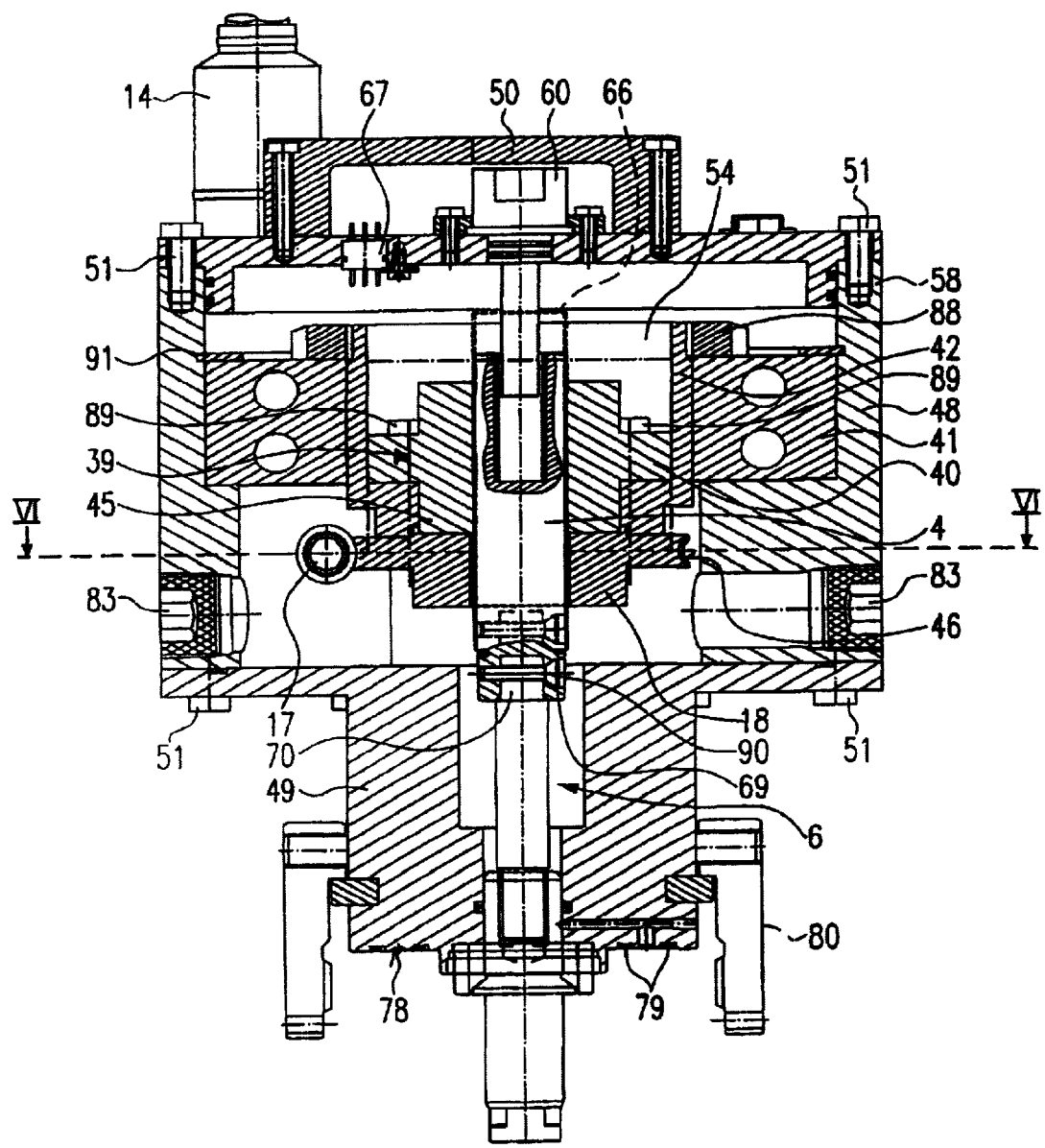
FIG. 5 shows a section along the line V—V of FIG. 4 or 6, respectively.

At the sub-housing 49, a corresponding threaded sleeve 80, see FIG. 5, is not depicted for simplification reasons. It is retained at the sub-housing 49 by a support ring 99 and is rotatably mounted there.

FIG. 5 is a section along the line V—V of FIG. 4.

The difference to the isolating device 1 according to the first embodiment is essentially that the worm wheel 18 is directly movably connected to the screw nut 40 and detachably mounted to the end 45 thereof. The turning spindle 4 extends through the screw nut 40, in this case, too, the screw 39 formed of screw nut 40 and turning spindle 4 being designed as a planetary roller screw.

The screw nut 40 is stationanily mounted in the bearing sleeve 42, being connected thereto via studs 89 which at the same time stationarily connect the worm wheel 18 to the screw nut 40. The bearing sleeve 42 is mounted by thrust bearings 41 in the central body 53 forming the sub-housing 48 rotatably but stationarily with respect to axial displacement. The axial fixation within the central body 53 is effected by a ring nut 88 which is screwed-upon the bearing sleeve 42 from the outside.

Between the thrust bearing 41 and the central body 53, a retainer ring 91 which fixes the thrust bearing 41 is moreover arranged.

Figure 6:
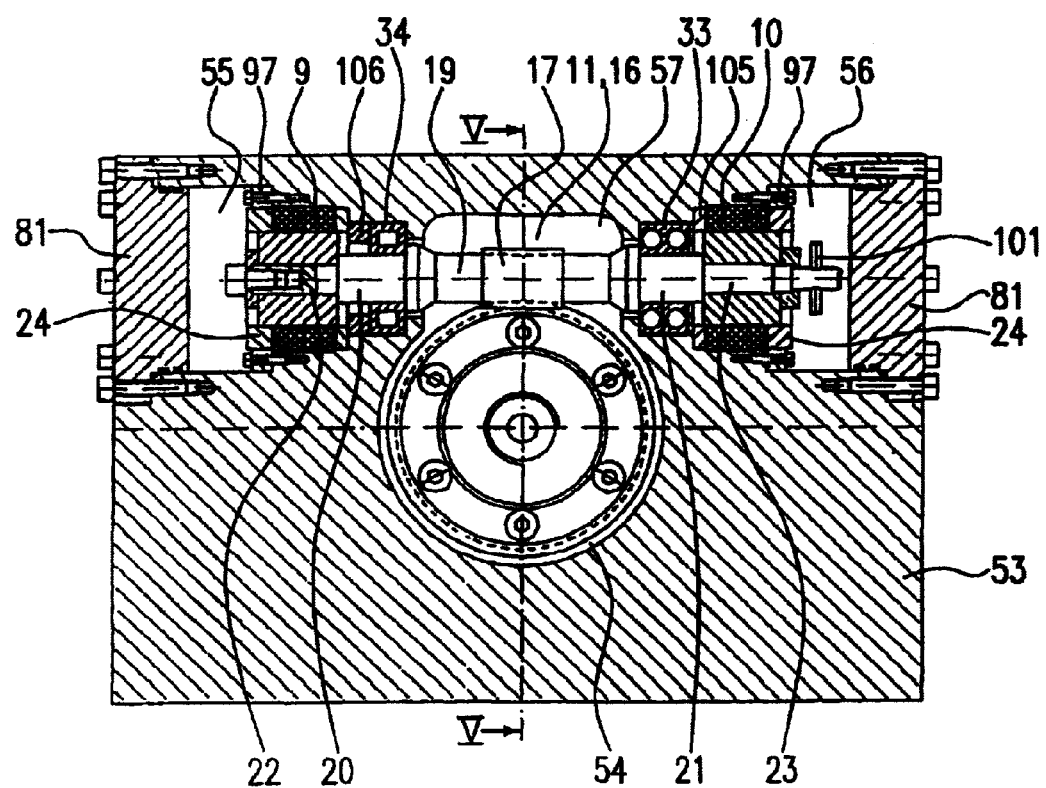
FIG. 6 shows a section along the line VI of FIG. 5.

The central body 53 is approximately cuboid, also see FIG. 6, and comprises the central bore 54 in which the screw nut 40 and the bearing sleeve 42 are rotatably mounted. The central bore 54 is detachably sealed at the upper end in FIG. 5 by the end plate 59 by means of studs 51. The electric passage 67 is arranged in the end plate 59.

At an outer side of the end plate 59, the further hood-like sub-housing 50 is arranged, also see FIG. 2. Between this and the end plate 59, the positioning sensor 60 is arranged. The positioning sensor is mounted analogously to FIG. 2.

The turning spindle 4 is fixed thereto at its end 69 facing the operating element 6 by inserting a corresponding end 70 of the operating element 6 into a bore at the end 69 of the spindle 4 and fixing it therein by a stud.

The operating element 6 extends through the further sub-housing 49 beyond the same, a corresponding isolation stop valve, see FIG. 2, not being depicted in FIG. 5 for simplification reasons.

In the end face 78 of the sub-housing 49 to be associated to the injection valve 2, sealing elements 79 are arranged in the form of O-rings.

FIG. 6 corresponds to a section along the line VI—VI of FIG. 5.

The central body 53 in turn comprises the two motor openings 55 and 56, also see FIG. 3, in each of these openings, one electromotor 9,10 being fixed by means of mountings 97 and ring nuts 24. The connection opening 57, in which the worm shaft 19 with worm 17 is arranged, extends between the motor openings 55 and 56.

Shaft ends 20, 21 of the worm shaft 19 are in turn rotatably mounted in the motor openings 55, 56 by means of ball bearings 33 or roller bearings 34, respectively. The corresponding bearings 33, 34 are held by the electric motors 9,10 via spacing disks 105,106.

The motor shafts 22, 23 are in turn stationanily connected to the shaft ends 20, 21 or integrally formed therewith. The motor shafts 22, 23 are mounted with respect to the electric motors 9,10 via studs with corresponding spacing disks.

Analogously to the first embodiment, it is possible to associate an emergency release device 26 to at least one of the electric motors 9,10. The same can be operated electrically or manually. The manual operation can, for example, be effected via a pin 101 extending transversely at the motor shaft 23 and it can be engaged with a non-depicted operating device. This operating device would be inserted into the opening sealed by the end plate 81.

In the following, the functioning of the isolating device according to the invention is illustrated in brief with reference to the Figures.

In both embodiments, a self-locking drive unit 11 is used, which is formed in the embodiment according to FIG. 3 by an additional volute spring 29 with corresponding sleeves 27, 28, 31, and in the embodiment according to FIG. 5 by the worm gear pair 16. This drive unit comprises the worm shaft 19 which is actively connected at both ends each with an electric motor 9,10. The two motors can be operated individually or also synchronously relative to one another. With a corresponding operation of the electric motors 9,10, the worm shaft 19 and thus the worm 17 rotate. Via the engagement with the worm wheel 18, the same rotates corresponding to the worm 16 with a corresponding multiplication. The worm wheel 18 rotates either directly, see FIG. 5, or via the bearing sleeve 36, see FIG. 2, the screw nut 40, the turning spindle 4 is again rotated therein with a corresponding multiplication. As the screw nut 40 is axially fixed in the corresponding device housing 3, by the rotation of the turning spindle 4, the same is also adjusted in the longitudinal direction of the device housing 3. Corresponding to the rotation of the turning spindle 4, the operating element 6 with the isolation stop valve arranged thereon is also adjusted. Depending on the adjustment of the operating element 6, the connection line 62 in the injection valve 2 is closed or more or less opened by the isolation stop valve 7.

When the connection line 62 is opened or partially opened, corresponding fluid is dispensed from the fluid pump 63 via the valve arrangement 64 to further, non-depicted devices.

The restoration of the isolation stop valve 7 into its starting position or of the turning spindle 4 into its starting position can be effected via corresponding reverse operations of the electric motors 9,10, the operation thereof being assisted in the embodiment according to FIG. FIG. 2 by applying a corresponding force to the spring arrangement 65.

If the electric motors fail, the self-locking of the drive unit 11 can be furthermore overcome by a corresponding emergency release device 26, see for example FIG. 3.

By means of the isolating device according to the invention, in particular with a synchronous operation of both electric motors, this synchronization being effected with software with at least one electric motor as master and the other electric motor as slave, a high torque with high multiplications can be transmitted by the corresponding gearbox unit consisting of worm gear pair 16 and screw 39. Moreover, the isolating device can be controlled from a remote position without complicated constructions for the control and supply of the corresponding device near the actual drilling site in oil mining or the like having to be arranged.

What is claimed is:

1. An isolating device for an injection valve comprising:
    a turning spindle rotatably mounted in a device housing;
    a drive device connected to the device housing and comprising at least two individually or synchronously operable electric motors;
    an operating element having an isolation stop valve for controlling the injection valve;
    a gearbox unit connecting said turning spindle to said operating element and comprising at least one self-locking drive unit actively connected to the electric motors, wherein said gearbox unit converts motion from the turning spindle into axial displacement of said operating element, wherein the self-locking drive unit is a worm gear pair comprising a worm and a worm wheel, wherein the worm wheel is associated to the turning spindle, and the worm is associated to the electric motors.

2. The isolating device according to claim 1, wherein the electric motors are servomotors or direct-current servomotors.

3. The isolating device according to claim 1, further comprising a separate control device electrically connected to each electric motor.

4. The isolating device according to claim 3, wherein the electrical connection between the control devices and each electric motor is formed at the device housing.

5. The isolating device according to claim 3, further comprising an electrical passage, for the electrical connection of the electric motors with their control devices, arranged in an end plate of the device housing.

6. The isolating device according to claim 1, wherein the worm is arranged on a worm shaft, which is connected to the electric motors.

7. The isolating device according to claim 6, wherein one of the electric motors is connected to each shaft end of the worm shaft.

8. The isolating device according to claim 7, wherein each electric motor has a motor shaft and is stationarily connected to the respective shaft end of the worm shaft via its motor shaft.

9. The isolating device according to claim 8, wherein the electric motors are stationarily held in the device housing by means of one or more ring nuts.

10. The isolating device according to claim 6, wherein each shaft end of the worm shaft is rotatably mounted in the device housing by means of ball bearings and/or roller bearings.

11. The isolating device according to claim 10, wherein the worm wheel is disposed on a bearing shaft that is movably connected to the turning spindle.

12. The isolating device according to claim 11, further comprising a bearing sleeve arranged between the worm wheel and the bearing shaft.

13. The isolating device according to claim 12, wherein the bearing sleeve and worm wheel are connected by a splined shaft connection and/or studs.

14. The isolating device according to claim 11, wherein said gearbox comprises a screw nut arranged in a bearing sleeve mounted in the device housing such that the screw nut can be rotated but not displaced axially.

15. The isolating device according to claim 14, wherein the bearing shaft engages the facing end of the turning spindle and is stationarily held therein.

16. The isolating device according to claim 15, further comprising at least one needle bearing arranged between the bearing sleeve and the device housing.

17. The isolating device according to claim 16, wherein at least one end of the screw nut engages an end gearing actively connected to the worm.

18. The isolating device according to claim 17, wherein the end gearing is formed by the worm wheel.

19. The isolating device according to claim 18, wherein the worm wheel is detachably mounted to the screw nut.

20. The isolating device according to claim 19, wherein the worm wheel is a globoid worm wheel.

21. The isolating device according to claim 20, wherein the worm is a cylinder worm.

22. The isolating device according to claim 21, wherein the bearing sleeve is mounted in the device housing by means of at least one thrust bearing.

23. The isolating device according to claim 22, wherein the device housing is modularly assembled from sub-housings which are interconnected by studs and threaded sleeves.

24. The isolating device according to claim 23, wherein the sub-housings are tightly connected to one another.

25. The isolating device according to claim 24, wherein the device housing comprises a central body of metal, aluminum, or an aluminum alloy, the central body having a central bore in which the screw nut is mounted and along which the turning spindle extends.

26. The isolating device according to claim 25, wherein the central body comprises:
    two motor openings opened radially to the outside, in each of which one electric motor is detachably mounted; and
    a connection opening for arranging the worm shaft and worm extending between the motor openings and essentially tangential to the central bore.

27. The isolating device according to claim 26, wherein the central body is detachably sealed at one of its ends with an end plate.

28. The isolating device according to claim 27, further comprising a positioning sensor arranged essentially centrally to an end plate and associated to one end of the turning spindle.

29. The isolating device according to claim 28, wherein the device housing, or a sub-housing, can be detachably mounted to an injection valve housing and the isolation stop valve can be displaced within the injection valve housing in direction towards a connection line between a fluid pump and a valve arrangement of the injection valve for variably isolating the connection line.

30. The isolating device according to claim 29, wherein at least one sub-housing contains a spring arrangement for applying force to the operating element or the turning spindle and is arranged in the direction of the starting position.

31. The isolating device according to claim 11, wherein the bearing shaft, turning spindle and operating element are essentially arranged coaxially and are detachably connected at their facing ends.

32. The isolating device according to claim 1, wherein each electric motor has a motor shaft and the motor shaft of at least one of the electric motors is elongated at a first end facing away from the worm shaft and is movably connected to an emergency release device at the first end.

33. The isolating device according to claim 32, wherein the emergency release device comprises:
 a supporting sleeve stationarily mounted in the device housing;
 a spacing sleeve mounted to rotate relative to the supporting sleeve; and
 a detachable volute spring being wound on said supporting sleeve and said spacing sleeve.

34. The isolating device according to claim 33, wherein the volute spring engages with one of its ends a release sleeve which is actively connected to an electromotor, in particular a stepper motor.

35. The isolating device according to claim 1, wherein said gearbox unit comprises a ball screw consisting of at least one ball nut and the turning spindle is a recirculating ball screw.

36. The isolating device according to claim 1, wherein said gearbox unit comprises a roller screw having at least one roller nut and the turning spindle is a recirculating roller screw.

37. The isolating device according to claim 36, wherein the roller screw is a planetary roller screw.

38. The isolating device according to claim 1, wherein the electric motors are software synchronized.

39. The isolating device according to claim 1, wherein one electric motor is switched as master and the other electric motor is switched as slave or both electric motors are switched as master.

40. The isolating device according to claim 1, wherein the device housing is filled with oil and compensated.

41. The isolating device according to claim 1, wherein the operating element comprises a piston housing movably connected to a shaft section connected to the turning spindle.

42. The isolating device according to claim 41, wherein the shaft section is surrounded by an annular locknut which is screwed in the device housing for fixing the starting position of the piston housing.

43. The isolating device according to claim 42, wherein at its end facing the locknut, the piston housing comprises an end flange radially projecting to the outside, which end flange is adjacent to one end of a spring arrangement for applying force to the operating element or the turning spindle.

44. The isolating device according to claim 43, wherein at its end face to be associated to the injection valve, the device housing comprises sealing elements for a tight mounting at the injection valve housing.

45. An injection valve system comprising:
 a fluid pump;
 a valve arrangement;
 a connection line providing fluid communication between said fluid pump and said valve arrangement;
 an isolation stop valve having a slider opening therethrough; wherein said isolation stop valve is linearly moveable between an open position where the slider opening is aligned with said connection line and a closed position wherein said isolation stop valve interrupts said connection line;
 an operating element connected to said isolation stop valve;
 a gearbox unit connected to said operating element; and at least one electric motor, wherein said gearbox unit is operable to convert rotational motion generated by said electric motor into linear motion applied to said operating element in order to linearly shift said isolation stop valve from the open position to the closed position, wherein said gearbox unit further comprises:
 a worm mounted on a worm shaft;
 a worm wheel engaged with said worm; and
 an electric motor connected to each end of the worm shaft.

46. The injection valve system of claim 45 further comprising:
 a screw rotatably engaged with said worm wheel; and
 a spindle engaged with said screw and said operating element, wherein said spindle translates axially as said screw rotates.

47. The injection valve of claim 45 further comprising an emergency release device coupled to the worm shaft.

48. The injection valve of claim 47 wherein said emergency release device comprises:
 a stationary sleeve;
 a rotating sleeve coupled to said worm shaft; and
 a volute spring engaged with said stationary sleeve and said rotating sleeve.

49. The injection valve of claim 48 wherein said emergency release device further comprises:
 a release sleeve engaged with one end of said volute spring; and
 an electric motor coupled to said release sleeve.

50. The injection valve of claim 45 further comprising a spring biasing said isolation stop valve to the closed position.

51. The injection valve of claim 45 further comprising a position sensor operable to monitor the linear position of said operating element.

52. A valve actuator comprising:
 a worm mounted on a worm shaft;
 a worm wheel engaged with said worm;
 an electric motor connected to each end of the worm shaft;
 a screw rotatably engaged with said worm wheel;
 a spindle engaged with said screw, wherein said spindle translates axially as said screw rotates; and
 an isolation stop valve connected to said screw by a shaft, wherein said isolation stop valve is linearly movable to selectively control fluid communication through a valve.

53. The valve actuator of claim 52 further comprising a spring operable to bias said isolation stop valve to a position interrupting fluid communication through the valve.

54. The valve actuator of claim 52 further comprising a position sensor operable to monitor the linear position of said spindle.

55. The valve actuator of claim 52 further comprising an emergency release device coupled to the worm shaft.

56. The valve actuator of claim 52 wherein said emergency release device comprises:
- a stationary sleeve;
- a rotating sleeve coupled to said worm shaft; and
- a volute spring engaged with said stationary sleeve and said rotating sleeve.

57. The valve actuator of claim 52 wherein said emergency release device further comprises:
- a release sleeve engaged with one end of said volute spring; and
- an electric motor coupled to said release sleeve.

* * * * *